United States Patent [19]

Selvig et al.

[11] Patent Number: 5,236,978

[45] Date of Patent: * Aug. 17, 1993

[54] RESIN COMPOSITION OF POLYOL (ALLYL CARBONATE) AND ALLYL TERMINATED ALIPHATIC URETHANE

[75] Inventors: Christopher D. Selvig, Pittsburgh; John C. Crano, Murrysville, both of Pa.

[73] Assignee: PPG Industries, Inc., Pittsburgh, Pa.

[ * ] Notice: The portion of the term of this patent subsequent to Feb. 19, 2008 has been disclaimed.

[21] Appl. No.: 767,164

[22] Filed: Sep. 27, 1991

[51] Int. Cl.$^5$ .................. C08K 5/04; C08K 283/00
[52] U.S. Cl. ........................ 524/81; 525/455; 526/301
[58] Field of Search ............... 525/455, 920; 526/301; 524/81

[56] References Cited

U.S. PATENT DOCUMENTS

| | | | |
|---|---|---|---|
| 3,565,814 | 2/1971 | Pellon | 252/300 |
| 4,360,653 | 11/1982 | Stevens et al. | 526/301 |
| 4,613,656 | 9/1986 | Tang | 526/62 |
| 4,994,208 | 2/1991 | McBain et al. | 252/586 |
| 5,084,529 | 1/1992 | Crano | 525/455 |

FOREIGN PATENT DOCUMENTS

| | | |
|---|---|---|
| 227337 | 7/1987 | European Pat. Off. . |
| 6211743 | 7/1987 | European Pat. Off. . |
| 62-11743 | 1/1987 | Japan . |

Primary Examiner—Christopher Henderson
Attorney, Agent, or Firm—Irwin M. Stein

[57] ABSTRACT

Describes polymerizable organic resin compositions of from about 70 to 90 weight percent of a polyol(allyl carbonate), e.g., diethylene glycol bis(allyl carbonate), and from about 30 to 70 weight percent of aliphatic polyurethane having terminal allylic unsaturation. The polymerizable compositions have initiated pot life times of at least about 24 hours at 25° C. and castings that have low yellowness (b*) values. Polymerizates prepared from such compositions may be used to prepare photochromic articles, e.g., lenses, by incorporating a photochromic substance, e.g., by thermal transfer, into the polymerizate.

15 Claims, No Drawings

RESIN COMPOSITION OF POLYOL (ALLYL CARBONATE) AND ALLYL TERMINATED ALIPHATIC URETHANE

DESCRIPTION OF THE INVENTION

The present invention relates to polymerizable synthetic polyol(allyl carbonate) compositions and articles prepared therefrom, particularly articles having organic photochromic material(s) applied to or incorporated therein. More particularly, the present invention relates to certain polymerizable polyol(allyl carbonate) compositions that contain from about 10 to about 30 weight percent of aliphatic urethane having allylic unsaturation at its terminal ends, and photochromic articles prepared from polymerizates of such compositions. These polymerizable polyol(allyl carbonate) compositions have an initiated pot life comparable to initiated diethylene glycol bis(allyl carbonate), and photochromic articles prepared therefrom are characterized by an improved photochromic response.

Photochromism is a phenomenon involving a change in color of a photochromic substance (or an article containing such a substance) when it is exposed to light radiation involving ultraviolet rays, such as ultraviolet radiation contained in sunlight or in the light of a mercury lamp, and a reversion to the original color when the influence of the ultraviolet radiation is discontinued, e.g., by storing the substance (or article) in the dark or removing the source of ultraviolet radiation. In recent years, photochromic plastic materials, particularly plastic materials for optical applications, have been the subject of considerable attention. In particular, photochromic ophthalmic plastic lenses have been investigated because of the weight advantage they offer, vis a vis, glass lenses. Moreover, photochromic transparencies for vehicles, such as cars and airplanes, have been of interest because of the potential safety features that such transparencies offer.

When incorporated within the matrix of a synthetic organic transparency (or applied to a substrate of such matrix), a photochromic substance changes color when exposed to ultraviolet light. This change in color reduces the amount of light transmitted through the transparency. It is desirable that the equilibrium response of the photochromic substance-containing transparency at all normal ambient temperatures, including relatively high ambient temperatures, e.g., temperatures on the order of 95° F. (35° C.), be significant.

It is reported that when a photochromic substance, e.g., a photochromic compound, converts to its colored form by absorption of ultraviolet light radiation, i.e., the so-called coloring reaction, a reverse action occurs simultaneously in which the colored form reverts to the colorless (or original color) form as a result of exposure to white light and/or the action of heat, i.e., the so-called bleaching reaction. The rate of bleaching due to heat (thermal fade) increases with increasing temperature. At relatively high ambient temperatures, e.g., 95° F. (35° C.), the rate of thermal fade can become very high and, as a consequence, the photochromic substance does not develop a sufficiently intense color, i.e., the luminous transmission of a transparency at such temperatures is significantly larger than at lower temperatures, e.g., 55°–75° F. (13°–24° C.). Stated conversely, the activated color of the photochromic transparency is lighter at high ambient temperatures than at lower ambient temperatures.

It is reported in U.S. Pat. No. 4,994,208 that photochromic articles, e.g., transparencies, prepared from certain polymerizable polyol(allyl carbonate) compositions exhibit an improved photochromic equilibrium response compared to photochromic articles prepared from homopolymers of a polyol(allyl carbonate), such as diethylene glycol bis(allyl carbonate). This improved equilibrium response is suggested to be observable at temperatures of from 0° F. (−18° C.) to 115° F. (46° C), e.g., from 30° F. (−1° C.) to 100° F. (38° C.), particularly over the ambient temperature range from about 55° F. (13° C.) to about 95° F. (35° C.). Such improvement in the photochromic response is described to be a result of an improvement in the coloring efficiency, i.e., the efficiency of the so-called coloring reaction, in polymerizates of such polyol(allyl carbonate) compositions. More particularly, the polyol(allyl carbonate) compositions described in U.S. Pat. No. 4,994,208 comprise a mixture of a major amount of a polyol(allyl carbonate), e.g., diethylene glycol bis(allyl carbonate), and a minor amount of a certain urethane containing ethylenic unsaturation, e.g., arcylic functional groups, at its terminal ends. Optionally, a small amount of a copolymerizable difunctional monomer, such as allyl methacrylate, may be added to the composition to enhance the hardness of the polymerizate prepared from the polyol(allyl carbonate) composition.

DETAILED DESCRIPTION OF THE INVENTION

Plastic optical, e.g., ophthalmic, commercial lenses are prepared to a significant extent by polymerizing the polyol(allyl carbonate) monomer, diethylene glycol bis(allyl carbonate), with a free-radical initiator, usually a dialkyl peroxydicarbonate such as diisopropyl peroxydicarbonate, in molds. The pot life of a batch of diethylene glycol bis(allyl carbonate)-initiated monomer, i.e., monomer to which an initiating amount of free-radical initiator has been added, is on the order of about 24 hours at 25° C., which provides the manufacturer (caster) of lenses sufficient time to degass, filter and charge the entire batch of initiated monomer to molds before gelling of the monomer occurs.

Diethylene glycol bis(allyl carbonate) compositions described in U.S. Pat. No. 4,994,208, i.e., compositions containing an aliphatic polyesterurethane diacrylate, have a pot life, i.e., the time from initiation to gelling, on the order of 5 hours at 25° C. This significantly reduced pot life compared to diethylene glycol bis(allyl carbonate) can result in operating difficulties for the caster. Moreover, it has been found that castings prepared with such diethylene glycol bis(allyl carbonate) compositions may have a noticeable yellow cast, which is not desirable for articles, such as lenses, that are preferably clear.

It has now been discovered that polyol(allyl carbonate) compositions that contain a minor amount of certain bis(allyl-terminated) aliphatic urethane and that is substantially free of bis(acrylate terminated) aliphatic urethane have an initiated pot life of at least about 24 hours at 25° C. and can provide nearly colorless cast articles such as lenses.

In accordance with the present invention, there are provided certain liquid polymerizable polyol(allyl carbonate) compositions comprising a blend of copolymerizable monomeric materials; namely, (1) polyol(allyl carbonate) monomer and (2) aliphatic urethane having allyl unsaturation at its terminal ends. More particularly, the polymerizable polyol(allyl carbonate) monomer represents from about 70 to about 90 weight percent, preferably from about 75 to 85, particularly about 79 to about 84, e.g., about 83, weight percent of the copolymerizable composition. The urethane content of the blend (and the resulting polymerizate) will vary with the amount of allyl-terminated aliphatic polyurethane used. To avoid yellowing of castings as a result of a post-casting heat treatment, it is preferred that the urethane content of the blend be in the range of from about 3.9 to about 4.9 percent.

Polyol(allyl carbonate) monomers that may be used in the aforedescribed polymerizable composition are allyl carbonates of linear or branched aliphatic or aromatic liquid polyols, e.g., aliphatic glycol bis(allyl carbonate) compounds, or alkylidene bisphenol bis(allyl carbonate) compounds. These monomers may be described as unsaturated polycarbonates of polyols, e.g., glycols. The monomers may be prepared by procedures well known in the art, e.g., as described in U.S. Pat. Nos. 2,370,567 and 2,403,113.

Polyol(allyl carbonate) monomers may be represented by the graphic formula:

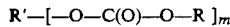

$$R'-[-O-C(O)-O-R\,]_m \qquad \text{I}$$

wherein R is the radical derived from an unsaturated alcohol and is commonly an allyl or substituted allyl group, R' is the radical derived from the polyol and m is a whole number from 2-5, preferably 2. The allyl group may be substituted at the 2-position with a halogen, most notably chlorine or bromine, or an alkyl group containing from 1 to 4 carbon atoms. Generally the alkyl substituent is a methyl or ethyl group. The allyl group may be represented by the graphic formula:

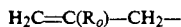

$$H_2C=C(R_o)-CH_2- \qquad \text{II}$$

wherein $R_o$ is hydrogen, halogen or a $C_1$-$C_4$ alkyl group. Most commonly, $R_o$ is hydrogen and consequently R is the allyl group, $H_2C=CH-CH_2-$.

R' is a polyvalent radical derived from the polyol which can be an aliphatic or aromatic polyol contains 2, 4, 4 or 5 hydroxy groups. Typically, the polyol contains 2 hydroxy group, i.e., a glycol or bisphenol. The aliphatic polyol may be linear or branched and contains from 2 to 10 carbon atoms. Commonly, the aliphatic polyol is an alkylene glycol having from 2 to 4 carbons atoms or poly($C_2$-$C_4$) alkylene glycol, e.g., ethylene glycol, propylene glycol, trimethylene glycol, tetramethylene glycol, or diethylene glycol, triethylene glycol, etc.

Specific examples of polyol(allyl carbonate) monomers include ethylene glycol bis(2-chloroallyl carbonate), ethylene glycol bis(allyl carbonate), diethylene glycol bis(2-methyllyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis (2-ethylallyl carbonate), pentamethylene glycol bis(allyl carbonate), and isopropylidene bisphenol bis(allyl carbonate). Diethylene glycol bis(allyl carbonate) is the preferred polyol(allyl carbonate) monomer.

A detailed description of polyol(allyl carbonate) monomers that may be used to form the polyol(allyl carbonate) composition of the present invention is found in U.S. Pat. No. 4,637,698 at column 3, line 33 through column 5, line 61. That disclosure is hereby incorporated by reference and is summarized above. As used in the present description and claims, the term polyol(allyl carbonate) monomer or like names, e.g., diethylene glycol bis(allyl carbonate), are intended to means and include the named monomer or prepolymers thereof and any related monomer or oligomer species contained therein.

The polyol(allyl carbonate) composition of the present invention may contain from about 10 to about 30 e.g., 15 to 25, weight percent of an aliphatic urethane having allyl-unsaturation at its terminal ends. In a preferred embodiment of the present invention, the composition contains from about 16 to about 21, e.g., 17, weight percent of the allyl-terminated aliphatic urethane, which may be represented by the expression:

$$D-B-A-B-D \qquad \text{III}$$

wherein D represents the terminal functional group containing allyl unsaturation and B represents an aliphatic bis carbamic moiety originating from the corresponding aliphatic diisocyanate. Group B is formula III originates from such aliphatic diisocyanates. Expressed graphically, group B may be represented by the formula, $-OC(O)-NH(E)NH-C(O)-O-$, wherein E is the aliphatic (or cycloaliphatic) residue of the aliphatic diisocyanate.

Group A in formula III represents the residue of a saturated aliphatic polyol, e.g., diol, such as a $C_2$-$C_6$ alkane diol, diethylene glycol, a polyether diol, a polycarbonate diol or a polyester diol. Preferably, A is a polyester diol, diethylene glycol, or $C_2$-$C_6$, e.g., $C_2$-$C_4$, alkane diol. The allyl-terminated aliphatic urethane of formula III should form a homogeneous mixture in and be copolymerizable with the polyol(allyl carbonate), e.g., diethylene glycol bis(allyl carbonate), with which it is blended.

In a further embodiment of the present invention, the polyol(allyl carbonate) composition may contain from about 10 to about 30 weight percent of a mixture of allyl-terminated aliphatic urethanes. More particularly, the mixture of allyl-terminated aliphatic urethanes can be a mixture of materials wherein A and/or B in each urethane material of graphic formula III are different, e.g., when A is different and B is the same. An example includes a mixture of aliphatic urethanes wherein A is the residue of a polyester diol in one urethane component and A is the residue of an alkane diol in the other urethane component.

In a particular embodiment, there is contemplated a mixture of two allyl-terminated aliphatic urethanes, wherein the first urethane is an allyl-terminated polyesterurethane, i.e., wherein A in graphic formula III is the residue of a saturated polyester diol, e.g., poly(caprolactone) diol, and the second urethane is an allyl-terminated aliphatic urethane wherein A in graphic formula III is the residue of a $C_2$-$C_6$ alkane diol, e.g., butane diol. The molar ratio of the first urethane to the second urethane, i.e., the ratio of the allyl-terminated polyesterurethane to the allyl-terminated alkane diol urethane, may vary from about 0.9:0.1 to about 0.7:0.3, e.g., about 0.8:0.2.

The terminal functional group (D) in graphic formula III contains an allyl group, e.g., $CH_2=CH-CH$-

2—originating, for example, from allyl alcohol. Preferably, D is the allyl group.

Diisocyanates that may be used to prepare the aliphatic urethane component of the polyol(allyl carbonate) composition are aliphatic diisocyanates and cycloaliphatic diisocyanates. For convenience and brevity, such isocyanates will be referred to collectively as aliphatic diisocyanates. Such materials are substantially free of aromatic moieties. By substantially free of aromatic moieties is meant that the aliphatic diisocyanate (and thus the allyl-terminated aliphatic urethane component) contains 1 percent or less of aromatic diisocyanate groups. Examples of suitable diisocyanates include 1,6-hexamethylene diisocyanate, 1,4-tetramethylene diisocyanate and 1,10-decamethylene diisocyanate, 4,4'-methylenebis(cyclohexyl isocyanate), 4,4'-methylenebis(3-methyl cyclohexyl isocyanate), hydrogenated toluene diisocyanate (including hydrogenated products of: (a) the 2,4-isomer, (b) the 2,6-isomer, (c) the 80/20-2,4/2,6-isomer mixture and (d) the 65/32-2,4/2,6-isomer mixture), 4,4'-isopropylidene bis(cyclohexyl isocyanate), 1,4-cyclohexane diisocyanate, 4,4'-dicyclohexyl diisocyanate, 2,4'-dicyclohexyl diisocyanate, tetramethyl xylen diisocyanate, and 3-isocyanatomethyl-3,5,5-trimethylcyclohexane isocyanate. Preferably, the aliphatic diisocyanate is hydrogenated toluene diisocyanate or 3-isocyanatomethyl-3,5,5-trimethylcyclohexane isocyanate (isophorone diisocyanate).

In formula III, A represents the residue, i.e., after removal of the terminal hydroxyl groups, of a saturated aliphatic polyol, e.g., diol, such as an alkane diol containing from 2 to 6, e.g., 2 to 4, carbon atoms, diethylene glycol, polyether diols, polycarbonate diols and polyester diols. Preferably, the aliphatic polyol from which the group A originates is a liquid at room temperature and is a polyester diol or alkane diol.

Polyester diols may be prepared by techniques well-known in the art, e.g., using saturated dicarboxylic acids or anhydrides thereof (or combination of acids and anhydrides) and polyhydric alcohols, or by ring opening of caprolactones, e.g., epsilon caprolactone, with a straight chain glycol, e.g., diethylene glycol. Such polyester diols and their manner of preparation are well known and are fully described in the published literature. Many are commercially available in various molecular weights. Aliphatic dicarboxylic acids suitable for preparing polyesters are those containing from about 4 to about 14, preferably from about 6 to about 10, carbon atoms inclusive. Examples of such dicarboxylic acids include: succinic acid, glutaric acid, adipic acid, pimelic acid, suberic acid, azelaic acid and sebacic acid. Corresponding anhydrides can also be used. Typically, adipic and azelaic acids are used.

The polyhydric alcohols used in the preparation of polyester diols are typically aliphatic alcohols containing at least 2 hydroxy groups, e.g., straight chain glycols containing from 2 to 15, preferably from 4 to 8, carbon atoms inclusive. More preferably, the aliphatic alcohols contain only 2 hydroxy groups. The glycols contain hydroxyl groups preferably in the terminal positions. Examples of such polyhydric alcohols include ethylene glycol, diethylene glycol, triethylene glycol, tetraethylene glycol, 1,3-propane diol, 1,3-butane diol, 1,4-butane diol, 1,5-pentane diol, 2,2-dimethylpropane diol, 1,5-hexane diol, 1,7-heptane diol, 1,8-octane diol, 1,10-decane diol and mixtures of such polyhydric alcohols.

In preparing the polyester diol, the dicarboxylic acid (or anhydride thereof) is reacted with the polyhydric alcohol usually in the presence of a small amount of esterification catalyst, such as a conventional organo tin catalyst. The amount of acid and alcohol used will vary and depend on the molecular weight polyester desired. Hydroxy terminated polyesters are obtained by utilizing an excess of the alcohol, thereby to obtain linear chains containing a preponderance of terminal hydroxyl groups. Examples of polyesters include: poly(1,4-butylene adipate), poly(1,4-butylene succinate), poly(1,4-butylene glutarate), poly(1,4-butylene pimelate), poly(1,4-butylene suberate), poly(1,4-butylene azelate), poly(1,4-butylene sebacate) and poly(epsilon caprolactone). Polyester diols contemplated for use may have a molecular weight average molecular weight from about 400 to about 2000, e.g., from about 400 to 1000, based on hydroxyl end group analysis of the polymer.

Polycarbonate diols that may be used to prepare the aliphatic urethane component of the polyol (allyl carbonate) composition may have weight average molecular weights ranging from about 500 to 5000, e.g., 550 to 3300. more particularly from 750 to 1500, as determined by hydroxyl end group analysis. Aliphatic polycarbonate diols are described in U.S. Pat. Nos. 3,248,414, 3,248,415, 3,248,416, 3,186,961, 3,215,668, 3,764,457 and 4,160,853. Such hydroxy-terminated polycarbonates may be prepared from (1) carbon dioxide and 1,2-epoxides, (2) cyclic carbonates, such as ethylene carbonate, or (3) from cyclic carbonates and 1,2-epoxides by methods known in the art. Polycarbonate diols may also be prepared by reacting aliphatic diols with bischloroformates of aliphatic diols in the presence of inert solvents and acid acceptors, e.g., tertiary amines. In addition, polycarbonate diols may be prepared from glycols, such as ethylene glycol, propylene glycol and diethylene glycol, and dialkyl carbonates, such as diethyl carbonate and dimethyl carbonate, by a transesterification reaction.

In particular, U.S. Pat. No. 4,160,853 describes the synthesis of aliphatic polycarbonate diols by the reaction of an aliphatic diol and a dialkyl carbonate in the presence of a titanium catalyst. The reaction sequence may be depicted by the following equation:

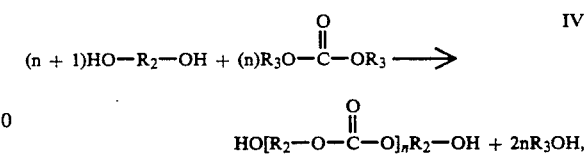

wherein n is a number from 4 to 46, $R_2$ is an aliphatic group (linear or cycloaliphatic) containing from 4 to about 10 carbon atoms, and $R_3$ is a lower alkyl group containing 1 to 4 carbon atoms. Preferred aliphatic diols include: 1,4-butane diol, and 1,6-hexane diol. Diethylcarbonate is a preferred dialkyl carbonate. The preferred catalysts are tetra-alkyl esters of titanium, particularly, tetrabutyl titanate. The disclosures of the aforedescribed patents relating to the preparation of aliphatic polycarbonate diols are hereby incorporated by reference.

Polyether diols, e.g., poly(oxyethylene)glycols, poly(oxy-1,2-propylene)glycols, and poly(oxy-1,4-butylene)glycol, that may be used to prepare the aliphatic polyurethan component of the polyol(allyl carbonate) composition may also vary in molecular weight. Poly(oxyethylene)glycols may range in molecular weight from about 200-4000, more particularly, 750-3300, e.g., 1000-2800. Liquid poly(oxyethylene)-glycols having molecular weights of below about 750, as determined by hydroxyl end group analysis, are particularly contemplated. Poly(oxyethylene)glycols may be prepared by reaction of ethylene oxide with water or ethylene glycol in the presence of a catalytic amount of a Lewis acid at 50°-70° C. or Lewis base at 120°-200° C.

Poly(oxypropylene)glycols may be prepared in a manner similar to poly(oxyethylene)glycols. Molecular weights of the poly(oxypropylene) glycols that may be used to prepare the polyol(allyl carbonate) composition may vary from about 400 to about 4000, e.g., 400 to about 2000, or 400 to about 1200, as determined by hydroxyl end group analysis. Liquid poly(oxypropylene)glycols are particularly contemplated.

In addition, block and random hydroxyl terminated copolymers of ethylene oxide and propylene oxide may be used. Further, polyether diols prepared from 1,2-butylene oxide, i.e., poly(oxy-1,2-butylene)glycol, and tetrahydrofuran are also contemplated.

Alkane diols contemplated for use in preparing the aliphatic urethane component of the polyol(allyl carbonate) composition are alkane diols containing from 2 to 6 carbon atoms, e.g., ethylene glycol, propylene glycol, 1,4-butane diol, 1,5-pentane diol and 1,6-hexane diol. Preferably, the alkane diols contain terminal hydroxy groups.

The allyl-terminated aliphatic urethane may be prepared by methods well documented in the literature and known to those skilled in the art. For example, the aliphatic diisocyanate may be reacted with allyl alcohol at from 30°-60° C., e.g., 50°-60° C., in the presence of a conventional organo tin catalyst, e.g., dibutyl tin dilaurate, to form as a principal product the monoallyl alcohol substituted aliphatic diisocyanate. Thereafter, two moles of the monoallyl alcohol substituted aliphatic diisocyanate is reacted with saturated aliphatic diol, e.g., polyester diol and/or alkane diol, at about 60°-70° C. in the presence of the organo tin catalyst to form the allyl-terminated aliphatic urethane. As used herein, the phrase "containing terminal allyl unsaturation" with respect to the aliphatic urethane means that each terminal end of the urethane contains a functional group containing allylic unsaturation. The allyl-terminated aliphatic urethane may be prepared in any suitable organic solvent. In a preferred embodiment, the solvent is the polyol(allyl carbonate), e.g., diethylene glycol bis(allyl carbonate), with which the allyl-terminated aliphatic urethane is to be copolymerized.

When using the polyol(allyl carbonate) monomer as the reaction medium, the allyl terminated aliphatic urethane may comprise from 10 to 70 percent of the product removed from the reaction vessel. If the polyurethane comprises an amount greater than the 10 to 30 weight percent desired for the polymerizable compositions described herein, the reaction product can be diluted with additional polyol(allyl carbonate) until the composition desired is obtained.

In the embodiment wherein the allyl terminated aliphatic urethane used is a mixture of two dissimilar aliphatic urethanes, each of the dissimilar urethanes can be prepared as described hereinabove and then each blended (or diluted) with the polyol(allyl carbonate) monomer in the required proportions to obtain the desired composition. Alternatively, the dissimilar aliphatic urethanes can be synthesized simultaneously. In this latter feature, the monoallyl alcohol substituted aliphatic diisocyanate is prepared as hereinbefore described and to this material is added (1) a blend of the aliphatic polyol(diol) reactants, i.e., the reactants forming the residue of the "A" moiety in graphic formula III, in the desired mole ratio proportions, e.g., the polyester diol and alkane diol, or (2) the dissimilar aliphatic diols added sequentially. Preferably, the aliphatic diol that represents the larger amount of the two diols is added first. For example, when the aliphatic polyols used are a polyester diol, e.g., poly(caprolactone) diol and an alkane diol, e.g., butane diol, and the molar amount of the polyester diol is larger than the alkane diol, e.g., the mole ratio of the polyester diol to the alkane diol is 0.9:0.1, the polyester diol is added first to the monoallyl alcohol substituted aliphatic diisocyanate followed by the alkane diol.

Aliphatic urethanes containing terminal allyl functionality may be further depicted by the following graphic formula:

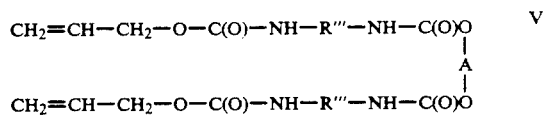

wherein A is the residue of the aliphatic polyol, e.g., polyester diol or alkane diol, and R''' is the hydrocarbon portion of the aliphatic diisocyanate. By selecting A and R''' from the examples described hereinbefore, the aliphatic urethane can be varied to provide different allylic-terminated aliphatic urethanes that can be copolymerized with the polyol(allyl carbonate) monomer.

Polymerization of the polyol(allyl carbonate) composition may be accomplished by adding to the composition an initiating amount of material capable of generating free radicals, such as organic peroxy compounds. Methods for polymerizing polyol(allyl carbonate) compositions are well known to the skilled artisan and any of those well known techniques may be used to polymerize the aforedescribed polymerizable composition. Suitable examples of organic peroxy compounds include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropyl peroxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting resin polymerizate, such as diisopropyl peroxydicarbonate.

The amount of initiator used to initiate and polymerize the polyol(allyl carbonate) composition may vary and will depend on the particular initiator used. Only that amount that is required to initiate and sustain the polymerization reaction is required, i.e., an initiating amount. With respect to the preferred peroxy compound, diisopropyl peroxydicarbonate, typically between about 2.4 and about 3.5 parts of that initiator per 100 parts of the polymerizable composition (phm) may be used. More usually, between about 2.75 and about 3.25 parts of that initiator per 100 parts of polymerizable composition is used to initiate the polymerization. The amount of initiator and the consequent cure cycle should be adequate to produce a polymerizate having a 15 second Barcol hardness of at least 10, preferably, at least 14, e.g., 10 to 35. Typically, the cure cycle involves heating the polymerizable composition in the presence of the initiator from room temperature to about 105° C. over a period of about 17 hours. The surface of the cured matrix should not be so hard that imbibition of photochromic substances into the matrix by immersion or thermal transfer is inhibited or prevented if that method of incorporating the photochromic substance is used. In one embodiment, the polymerizate is slightly undercured to enhance permeation of the photochromic substance.

Various additives may be incorporated with the polymerizable polyol(allyl carbonate) composition. Such additives may include light stabilizer, heat stabilizers and ultraviolet light absorbers. In addition, it is contemplated that a form of photochromic substance resistant to the effects of the peroxy-type initiator may also be added to the polymerizable resin composition. Such photochromic substances include photochromic pigments and photochromic compounds encapsulated in metal oxides, the latter of which is such as described in U.S. Pat. No. 4,166,043 and 4,367,170.

In addition to its contemplated that from about 0.1 to about 0.5, e.g., 0.1 to 0.4, weight percent, based on the weight of the copolymerizable mixture, of a dialkyl pyrocarbonate may be added to the polymerizable composition. Such dialkyl pyrocarbonates may be represented by the graphic formula, R"—O—C(O)—O—C(O)—O—R", wherein R" is selected from the group consisting of $C_1$–$C_{12}$ alkyl and $C_6$–$C_{10}$ cycloalkyl. Preferably, R" is a lower alkyl, e.g., $C_1$–$C_4$ alkyl, such as ethyl. Diethylpyrocarbonate is economically preferred. The use of dialkyl pyrocarbonates to inhibit yellowing of castings of polyl(allyl carbonate) compositions is described in U.S. Pat. No. 5,084,529 the description of which dialkyl pyrocarbonates is hereby incorporated herein in toto by reference.

The synthetic organic polymerizate obtained by polymerization of the polyol(allyl carbonate) composition will preferably be transparent or optically clear so that it may be used for optical lenses, such as plano and ophthalmic lenses, windows, automotive transparencies, e.g., windshields, T-roofs, sidelights and backlights, and for aircraft transparencies, etc. The polymerizate should be transparent to that portion of the electromagnetic spectrum which activates the photochromic substance(s) incorporated in the matrix, i.e., that wavelength of ultraviolet (UV) light that produces the colored or open form of a photochromic substance and that portion of the visible spectrum that includes the absorption maximum wavelength of the photochromic substance in its UV activated form, i.e., the open form.

Since the polymerizable polyol(allyl carbonate) composition comprises from about 70 to 90 weight percent polyol(allyl carbonate) the physical properties of the cured (polymerized) material of the present invention are similar to those obtained for homopolymers of the polyol(allyl carbonate) monomer, e.g., diethylene glycol bis(allyl carbonate). For optical applications, such properties include relatively low yellowness, low haze, adequate impact strength and hardness, suitable abrasion resistance for polymerizates of polyol(allyl carbonate), dyeability and organic solvent resistance. Such physical properties are described in "The Handbook of Plastic Optics", second edition, U.S. Precision Lens, Inc., Cincinnati, Ohio, 1983, which is incorporated herein by reference.

Photochromic articles described herein may be obtained by incorporating in or applying to the aforedescribed synthetic organic solid polymerizate (host material) at least one organic photochromic compound or compositions containing at least one organic photochromic compound (hereinafter collectively referred to as "photochromic substances(s)"). Incorporation or application of a photochromic substance to the host material may be accomplished by various methods described in the art. Such methods include dissolving or dispersing the photochromic substance within the plastic host, e.g., imbibition of the photochromic substance into the plastic host by immersion in a hot solution of the substance or by thermal transfer; providing the photochromic substance as a separate layer between adjacent layers of the host material, e.g., as part of a polymer film; and applying the photochromic substance as part of a coating placed on the surface of the host. The term "imbibition" or "imbibe" is intended to mean and include permeation of the photochromic substance alone into the subsurface of the synthetic plastic host material, solvent assisted transfer absorption of the photochromic substance into the polymerizate, vapor phase transfer and other such transfer mechanisms. The thermal transfer of photochromic substances into a transparent plastic host material is known to the skilled artisan and is described in the literature. See for example, U.S. Pat. Nos. 4,286,957 and 4,880,667, and copending U.S. patent application Ser. No. 07/490,029, filed Mar. 7, 1990, which are incorporated herein in toto by reference.

The amount of photochromic substance(s) incorporated into the synthetic plastic host may vary and will depend on the method of incorporation. Typically, a sufficient amount, i.e., a "photochromic amount", of the photochromic substance(s) is used so that the resulting article is photochromic, i.e., produces a photochromic effect. By "photochromic" or "photochromic effect" is meant that when the photochromic-containing article is exposed to ultraviolet light, the article visibly changes color (or becomes colored) and then returns to its original color or colorless state when the ultraviolet light is removed. The photochromic effect may be readily observed by exposing such a photochromic substance-containing article to a source of natural ultraviolet light, such as the sun, or to an artificial ultraviolet light source, such as a Spectroline Super ® Lamp Model M ENF-28 (365 nanometers). Generally, the amount of photochromic substance(s) incorporated into the article may vary from about 0.01 to about 10 or 20 weight percent. More typically, the amount of photochromic substance(s) incorporated into the article may range from about 0.1 to about 2 weight percent, e.g., from about 0.05 to about 1 weight percent.

Photochromic substances that may be used to prepare the photochromic article of the present invention may be any suitable organic photochromic substance that provides a visual photochromic response when incorporated into the host material described herein; that are dispersible. e.g., soluble, within the host material, and that are chemically compatible with resin. Photochromic substances that may be used are varied. Particularly contemplated classes of photochromic compounds that may be used include: spiro(indolino)-type compounds, such as spiro(indolino)pyridobenzoxazines, spiro(indolino)naphthoxazines, spiro(benzindolino)pyridobenzoxazines, spiro(benzindolino)naphthoxazines, spiro(benzindolino)naphthopyrans, spiro(indolino)benzopyrane, spiro(indolino)naphthopyrans, spiro(indolino)quinopyrans, spiro(indolino)benzoxazines, chromenes, i.e., benzopyrans and 2H and 3H naphthopyrans, metal dithizonate compounds, fulgides or fulgimides and spiro(di)hydroindolizines.

The particular photochromic substance(s) selected for use will depend on its compatibility with the resin, including its solubility therein, and the particular change in color desired for the photochromic article. It is also contemplated that mixtures of two or more photochromic substances may be used.

Photochromic compounds that may be utilized to prepare photochromic articles of the present invention are for the most part described in the open literature and are the subject of various patent publications. For example, spiro(indolino)naphthoxazines have been described, among others, in U.S. Pat. Nos. 3,562,172, 3,578,602, 4,215,010 and 4,342,668. Spiro(indolino)pyridobenzoxazines are described in U.S. Pat. No. 4,637,698. Spiro(benzindolino)pyridobenzoxazines and spiro(benzindolino)-naphthoxazines are described in U.S. Pat. No. 4,931,218. Spiro(benzindolino)-naphthopyrans are described in Japanese patent publication 62/195383 and are represented by graphic formula VI

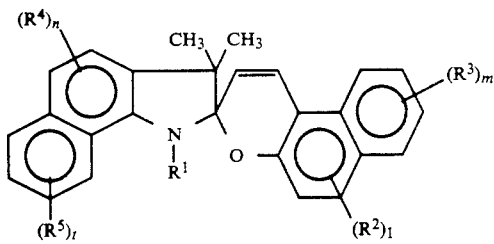

VI wherein $R^2$, $R^3$, $R^4$ and $R^5$ are alkyl groups having 1–4 carbons, halogen-substituted alkyl groups having 1 or 2 carbons, alkoxy groups having 1–4 carbons, halogen groups, or nitro group, l and n are integers of 0–2, m and t are integers of 0–4, where $R^2$, $R^3$, $R^4$ and $R^5$ may be identical or different; $R^1$ represents an unsubstituted or substituted alkyl group having 1–20 carbons, unsubstituted or substituted cycloalkyl group have 3–10 carbons, an unsubstituted or substituted aralkyl group having 7–20 carbons, or an unsubstituted or substituted aryl group having 6–14 carbons.

Spiro(indolino)benzoxazines are described in U.S. Pat. No. 4,816,584. Spiro(indolino)benzopyrans, spiro(indolino)-naphthopyrans and spiro(indolino)quinopyrans are described, for example, in U.S. Pat. No. 4,880,667. Spiropyrans are also described in the text, Techniques of Chemistry, Volume III Photochromism, Chapter 3, Glenn H. Brown, Editor, John Wiley and Sons, Inc. New York 1971.

Photochromic organo-metal dithizonates, i.e., (arylazo)-thioformic arylhydrazidates, e.g., mercury dithizonates, are described in, for example, U.S. Pat. No. 3,361,706. Fulgides and fulgimides, e.g. the 3-furyl and 3-thienyl fulgides and fulgimides are described in U.S. Pat. No. 4,220,708. 3-pyrryl fulgides and fulgimides are described in U.S. Pat. No. 4,737,449. Spiro(di)hydroindolizines are described, for example, in U.S. Pat. No. 4,931,220 at column 20, line 5 through column 21, line 38. Certain chromenes, i.e., benzopyrans and naphthopyrans, are described in U.S. Pat. Nos. 3,567,605, 4,826,977 and 4,980,089 and in copending U.S. patent applications Ser. Nos. 07/490,031 filed Mar. 7, 1990, 07/557,432 filed Sept. 23, 1990 and 07/624,816 filed Dec. 3, 1990.

Those portions of the aforementioned identified patent publications and applications that describe the various photochromic compounds generically and specifically are hereby incorporated in toto by reference. In particular, column 8, line 52, through column 22, line 40 of U.S. Pat. No. 4,931,220 which describes specific spiro(indolino)-type photochromic compounds and other photochromic compounds and the disclosure relating thereto is incorporated herein in toto by reference.

The present invention is more particularly described in the following examples, which are intended as illustrative only, since numerous modifications and variations therein will be apparent to those skilled in the art.

EXAMPLE 1

Diethylene glycol bis(allyl carbonate) (1170.8 g, 4.3 mole), isophorone diisocyanate (1111.5 g, 5 moles), and dibutyl tin dilaurate (0.5 g) were charged to a 5 liter, jacketed, 4-necked flask equipped with mechanical stirrer, addition funnel, thermometer, nitrogen purge and water/ethylene glycol temperature bath. The contents of the reaction flask were heated to 50° C. with rapid agitation and a moderate nitrogen purge for 25 minutes. The nitrogen purge was reduced and allyl alcohol (290.5 g, 5 moles) was added to the reaction flask over a period of two hours. After all of the allyl alcohol had been added, the temperature of the reaction flask was increased to 60° C. for one hour. Subsequently, about 900 grams (1.7 moles) of poly(caprolactone) diol (about 530 molecular weight) was charged to the reaction flask over 7 hours. Thereafter, an additional 425 grams (0.8 moles) of the poly(caprolactone) diol was charged to the reaction flask over 2 hours. The temperature of the flask was increased to 70° C. and held at that temperature for 3½ hours. The product was a 70 percent solution of bis(allyl-terminated) urethane derived from polycaprolactone diol in diethylene glycol bis(allyl carbonate).

EXAMPLE 2

Following the procedure of Example 1 using a 2 liter reaction flask equipped like the reaction flask of Example 1, diethylene glycol bis(allyl carbonate) (651 g, 2.4 mole), isophorone diisocyanate (444.6 g, 2 moles) and dibutyl tin dilaurate (0.5 g) were added to the reaction flask, heated to 50° C. with rapid agitation and moderate nitrogen purge for 25 minutes. Allyl alcohol (116.2 g, 2 moles) was charged to the flask over a period of 2 hours and the flask then heated to 60° C. for one hour. Subsequently, 1,4-butanediol (90.1 g, 1 mole) was added to the flask over 2 hours and the contents maintained at 60° C. for 1.5 hours. The product was a 50 percent solution of bis(allyl-terminated) urethane derived from butane diol in diethylene glycol bis(allyl carbonate).

EXAMPLE 3

A polyol(allyl carbonate) polymerizable composition of about 81.7 weight percent diethylene glycol bis(allyl carbonate), 18.1 weight percent of the bis(allyl-terminated) urethane of Example 1 and 0.2 weight percent diethyl pyrocarbonate was prepared by diluting the product of Example 1 with additional diethylene glycol bis(allyl carbonate) and adding the pyrocarbonate to the diluted mixture. This composition was initiated with 3.25 phm of diisopropyl peroxydicarbonate and cast into 6×6×0.25 inch (15×15×0.6 cm) sheets using a mold prepared from two flat glass plates separated by a gasket. The polymerizable composition was cured anaerobically by heating the composition slowly from about 44° C. to 105° C. over 17 hours. The cured sheet had a 15 second Barcol hardness of 16 (as measured at 23° C. with a Barcol Impressor Model GYZJ 934-1). The casting had a yellowness value (b*) of 0.5, as measured by a Spectrogard 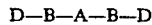 II Color System spectrophotometer.

EXAMPLE 4

In a manner similar to Example 3, a polyol(allyl carbonate) polymerizable composition of about 83.16 weight percent diethylene glycol bis(allyl carbonate), 14.48 weight percent of the bis(allyl-terminated) polycaprolactone urethane of Example 1, about 2.16 weight percent of the bis(allyl-terminated) butylene urethane of Example 2 and 0.20 weight percent diethyl pyrocarbonate was initiated with 2.75 phm of diisopropyl peroxydicarbonate and cast into sheets the size described in Example 3. The pot life (gel time) of the initiated composition was greater than 24 hours at 25° C. (estimated to be about 48 hours). The castings had a yellowness value (b*) of 0.4 and a 15 second Barcol hardness of 14.

EXAMPLE 5

The procedure of Example 4 was followed except that the polyol(allyl carbonate) composition comprised about 77.20 weight percent of diethylene glycol bis(allyl carbonate), 18.1 weight percent of the bis(allyl-terminated) polycaprolactone urethane of Example 1, 2.70 weight percent of the bis(allyl-terminated) butylene urethane of Example 2, and 0.20 weight percent of diethyl pyrocarbonate, and the composition was initiated with 3.25 phm of diisopropyl peroxydicarbonate. The gel time of the initiated composition was greater than 24 hours at 25° C. (estimated to be about 48 hours) and the casting had a yellowness value (b*) of 0.5.

COMPARATIVE EXAMPLE

A polyol(allyl carbonate) polymerizable composition of about 79.80 weight percent diethylene glycol bis(allyl carbonate), 20.00 weight percent of Uvithane ® 893 urethane diacrylate, 0.10 weight percent diethyl pyrocarbonate and 0.025 weight percent methoxy hydroquinone was initiated with 2.40 phm of diisopropyl peroxydicarbonate. The pot life of the initiated composition was about 5-5.5 hours at 25° C. The composition was cast into sheets, as described in Example 3. The castings had a 15 second Barcol hardness of 19 and a yellowness value (b*) of 1.6.

Although the present invention has been described with reference to the specific details of particular embodiments thereof, it is not intended that such details be regarded as limitations upon the scope of the invention except insofar as to and to the extent that they are included in the accompanying claims.

What is claimed is:

1. A polymerizable organic composition comprising a copolymerizable blend of:
   (a) polyol(allyl carbonate), and
   (b) from about 10 to about 30 weight percent of aliphatic urethane having allyl unsaturation at its terminal ends, said aliphatic urethane being representable by the expression:

D—B—A—B—D wherein D represents the functional group containing allyl unsaturation, B represents an aliphatic bis carbamic moiety representable by the formula —OC(O)—NH(E)NH—C(O)—O—, wherein E is the aliphatic residue of an aliphatic diisocyanate, and A represents the residue of a saturated aliphatic diol selected from the group consisting of $C_2-C_6$ alkane diols, diethylene glycol, polyester diol, polyether diol or polycarbonate diol.

2. The polymerizable composition of claim 1 wherein the polyol(allyl carbonate) is diethylene glycol bis(allyl carbonate) and the aliphatic urethane is present in amounts of from about 15 to about 25 weight percent.

3. The polymerizable composition of claim 2 wherein A is the residue of a saturated polyester diol.

4. The polymerizable composition of claim 3 wherein the polyester diol is poly(caprolactone) diol having a molecular weight of from about 400 to about 1000.

5. The polymerizable composition of claim 2 wherein the allyl-terminated aliphatic urethane comprises a mixture of (a) allyl-terminated aliphatic urethane wherein A is the residue of a saturated polyester diol, and (b) allyl-terminated aliphatic urethane wherein A is the residue of a saturated $C_2-C_6$ alkane diol or diethylene glycol, the molar amounts of (a):(b) being from about 0.9:0.1 to about 0.7:0.3.

6. The polymerizable composition of claim 5 wherein the polyester diol is poly(caprolactone) diol having a molecular weight of from about 400 to 1000, and the saturated alkane diol is a $C_2-C_4$ alkane diol.

7. The polymerizable composition of claim 6 wherein the poly(caprolactone) diol has a molecular weight of from about 400 to about 700, the alkane diol is butane diol, and the molar amounts of (a):(b) is about 0.8:0.2.

8. The polymerizable composition of claim 1 wherein the composition contains from about 0.1 to about 0.5 weight percent, based on the weight of the copolymerizable mixture, of dialkyl pyrocarbonate representable by the formula R"—O—C(O)—O—C(O)—O—R", wherein R" is selected from the group consisting of $C_1-C_{12}$ alkyl and $C_6-C_{10}$ cycloalkyl.

9. The polymerizable composition of claim 8 wherein the composition contains from about 0.1 to about 0.4 weight percent of dialkyl pyrocarbonate and the dialkyl pyrocarbonate is diethyl pyrocarbonate.

10. A solid organic resin prepared by polymerizing the composition of claim 1.

11. A solid organic resin prepared by polymerizing the composition of claim 3.

12. A solid organic resin prepared by polymerizing the composition of claim 5.

13. A solid organic resin prepared by polymerizing the composition of claim 7.

14. The polymerizable composition of claim 5 wherein the composition contains from 0.1 to about 0.5 weight percent based on the weight of the copolymerizable mixture of dialkyl pyrocarbonate representable by the formula R"—O—C(O)—O—C(O)—O—R", wherein R" is selected from the group consisting of $C_1-C_{12}$ alkyl and $C_6-C_{10}$ cycloalkyl.

15. The polymerizable composition of claim 14 wherein the composition contains from about 0.1 to about 0.4 weight percent of dialkyl pyrocarbonate and the dialkyl pyrocarbonate is diethyl pyrocarbonate.

* * * * *

UNITED STATES PATENT AND TRADEMARK OFFICE
CERTIFICATE OF CORRECTION

PATENT NO. : 5,236,978
DATED : August 17, 1993
INVENTOR(S) : Christopher D. Selvig et al It is certified that error appears in the above-indentified patent and that said Letters Patent is hereby corrected as shown below:

Claim 1, column 14, line 9, "-OC(O)-NH(E)NH-C(O)-O-" should be -- -O(O)C-NH(E)NH-C(O)O- --.

Claim 1, column 14, line 13, after "diol" add -- said composition being substantially free of bis(acrylate terminated aliphatic urethane and having an initiated pot life on the order of at least about 24 hour at 25°C.--

Signed and Sealed this

Eleventh Day of July, 1995

Attest:

BRUCE LEHMAN

*Attesting Officer*  *Commissioner of Patents and Trademarks*